United States Patent
Abildgaard et al.

(10) Patent No.: US 9,037,316 B2
(45) Date of Patent: May 19, 2015

(54) EARLY IDENTIFICATION OF A VORTEX RING PHASE

(75) Inventors: Max Abildgaard, Braunschweig (DE); Laurent Binet, Grans (FR)

(73) Assignees: Deutsches Zentrum für Luft- und Raumfahrt e.V., Köln (DE); Office national d'études et de recherche aérospatiales, Châtillon (FR)

( * ) Notice: Subject to any disclaimer, the term of this patent is extended or adjusted under 35 U.S.C. 154(b) by 0 days.

(21) Appl. No.: 13/809,628

(22) PCT Filed: Jul. 13, 2011

(86) PCT No.: PCT/EP2011/003494
§ 371 (c)(1),
(2), (4) Date: Mar. 20, 2013

(87) PCT Pub. No.: WO2012/007157
PCT Pub. Date: Jan. 19, 2012

(65) Prior Publication Data
US 2013/0173091 A1      Jul. 4, 2013

(30) Foreign Application Priority Data
Jul. 13, 2010 (DE) .......................... 10 2010 027 081

(51) Int. Cl.
*G06F 17/00* (2006.01)
*B64C 27/00* (2006.01)
(52) U.S. Cl.
CPC .............. *G06F 17/00* (2013.01); *B64C 27/006* (2013.01)

(58) Field of Classification Search
CPC ............................. G06F 17/00; B64C 27/006
USPC .............................................................. 701/7
See application file for complete search history.

(56) References Cited

U.S. PATENT DOCUMENTS

| 6,466,888 | B1 | 10/2002 | McCool |
| 2005/0004721 | A1 | 1/2005 | Einthoven |

(Continued)

FOREIGN PATENT DOCUMENTS

| FR | 2688314 A1 | 9/1993 |
| FR | 2921635 A1 | 4/2009 |
| WO | 2004/101358 A3 | 11/2004 |

OTHER PUBLICATIONS

Varnes, "Development of a Helicopter Vortex Ring State Warning System Through a Moving Map Display Computer", Thesis, Sep. 1, 1999.

(Continued)

*Primary Examiner* — Mary Cheung
*Assistant Examiner* — Yuen Wong
(74) *Attorney, Agent, or Firm* — Whitham Curtis Christofferson & Cook, PC (57) ABSTRACT

A method for early detection of the vortex ring state in a helicopter includes steps of establishing flight control signals for flight control with regard to the vertical movement axis of the helicopter, detecting resultant movements in the vertical movement axis of the helicopter, and detecting an impending vortex ring state of the helicopter in accordance with a correlation between the flight control signals and the vertical movements in the vertical movement axis.

5 Claims, 5 Drawing Sheets

(56) References Cited

U.S. PATENT DOCUMENTS

| | | |
|---|---|---|
| 2006/0145027 A1* | 7/2006 | Warsop et al. ............... 244/207 |
| 2006/0219840 A1* | 10/2006 | Einthoven et al. ......... 244/17.13 |
| 2008/0173753 A1 | 7/2008 | Ishihara |
| 2009/0089006 A1 | 4/2009 | Certain |

OTHER PUBLICATIONS

Johnson, "Model for Vortex Ring State Influence on Rotorcraft Flight Dynamics", NASA Technical Publication, Dec. 1, 2005, Moffet Field, CA.

* cited by examiner

EARLY IDENTIFICATION OF A VORTEX RING PHASE

FIELD OF THE INVENTION

The invention relates to a method for early detection of the vortex ring state in a helicopter. The invention also relates to a flight assistance system for said method.

In addition, the invention also relates to a method for determining the speed of a helicopter in the vertical movement axis relative to the air surrounding the helicopter. The invention also relates to a flight assistance system for said method.

BACKGROUND

The helicopter system is characterized by a rotor, which consists of a plurality of rotor blades and rotates at a defined speed. The individual rotor blades in this case have a specific profile and are also arranged on the rotor head of the rotor rotatably about their longitudinal axis, in such a way that a lift is generated by the cooperation between the rotor blade profile and the angle of incidence during the revolution and is similar to that of fixed-wing aircraft.

Vertical air movements are induced within the rotor plane due to the lift within the rotor plane caused by the rotor revolution. In the normal situation, a passage of air through the rotor from top to bottom is induced. In other words, the air is pressed downwardly through the rotor due to the lift that is generated by the rotating rotor and thus provides the helicopter with its flight characteristic, and therefore a vertical air movement, also referred to as downwash, is encountered in this case.

The rotor can also produce lift when air flows against it from below. This is what is known as "autorotation" or the "windmill state", which is used for example in the event of a power unit failure. The pitch angle of the rotor blades is then reduced and the individual blades generate their own propulsion, just as a glider can fly without drive. In this case, air flows against the rotor from below. The airflow is braked slightly by the rotor, which generates a force upwards. The downwash is then above the rotor.

Figure 1:
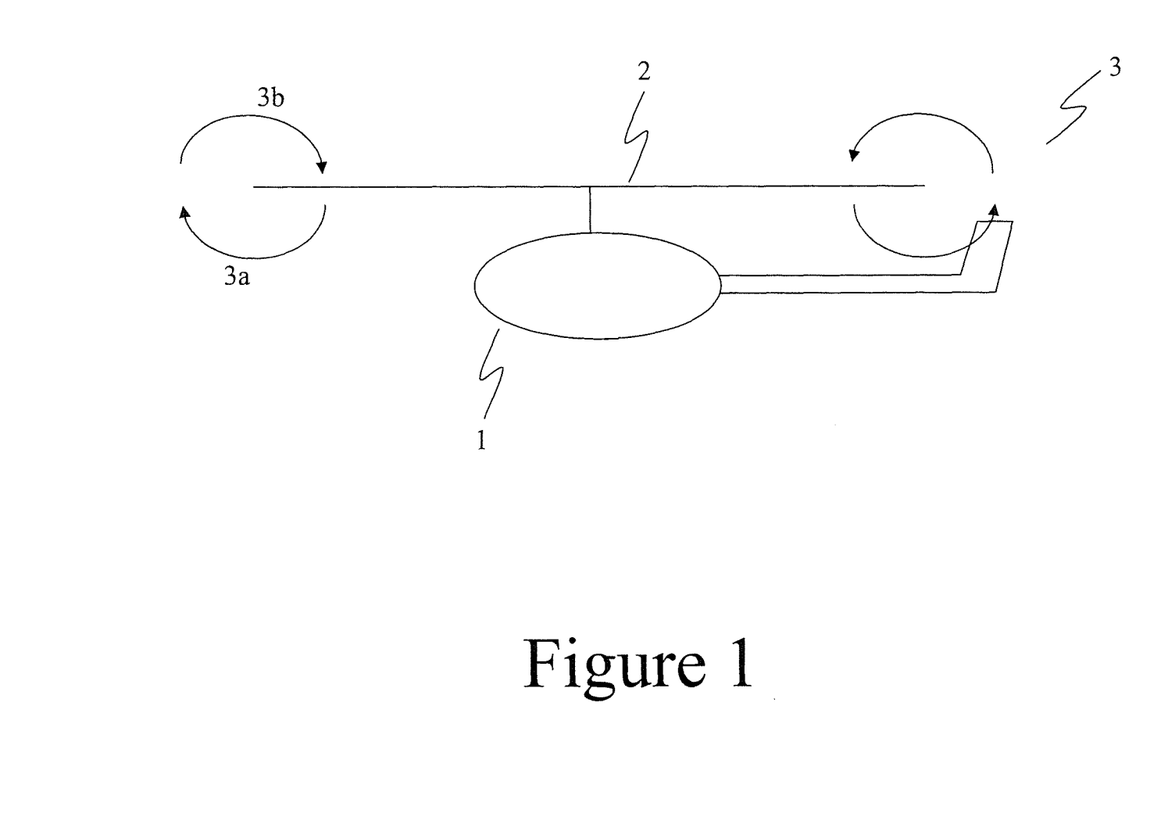
FIG. 1—shows a schematic illustration of the vortex ring state.

A dangerous flight condition may occur between the normal situation and autorotation if the helicopter falls in its own downwash due to its high descent rate and the very slow forward flight, this flight condition being known as the vortex ring state (VRS). In this case, ring vortices form at the tips of the rotor blades in such a way that the air masses pushed downwardly are sucked in again above the rotor. The downwardly directed air cannot escape quickly enough, and therefore the lift stops suddenly, such that the helicopter is uncontrollable to some extent and rapidly loses altitude. Up to 100 m of altitude are typically lost in the event of such a critical flight maneuver until the helicopter can be intercepted again accordingly. This has fatal consequences, particularly when close to ground level, with helicopters being suitable for flight at this height due to their system characteristics in particular. FIG. 1 shows an example of such a vortex ring state.

A problem is that the prediction of such a vortex ring state is highly inaccurate since the creation of the vortex is dependent on many factors. On the one hand there must be a correspondingly high descent rate, and on the other hand there must be a correspondingly slow forward flight or perhaps even no forward flight. In addition, the moment at which the vortex ring state is entered may be dependent on a range of ambient factors, which make the prediction process very imprecise.

A further problem, which is caused by the rotor downwash, is the highly inaccurate measurements of the relative movement of the air masses surrounding the helicopter. Sensors that detect a relative movement of the air masses surrounding an aircraft measure the dynamic pressure present and can thus establish the speed of an aircraft compared to the surrounding air. Such a sensor is known for example in the form of the pitot tube. The variometer is generally used in this case for changes in altitude and measures the change in speed of the air pressure dependent on the altitude.

All of these sensors have the disadvantage in this instance that they measure the movement relative to the air surrounding the aircraft, which is only possible to a limited extent within the downwash (beneath the rotor) of a helicopter rotor. This is because the downwash induced from the rotor lift falsifies the measurement of the relative speed of the surrounding air masses and therefore provides only an approximate estimation of such a speed.

Due to the inaccuracies of the sensors and the risk of the vortex ring state, helicopter pilots are currently trained to fly round the critical flight regions with the greatest safety margin possible. However, this leads to uneconomical flights in many areas, which is becoming increasingly significant in current times.

SUMMARY

In view of the above-mentioned problems, the object of the present invention is therefore to specify an improved method and a corresponding assistance system, with which the proximity to the vortex ring state can be detected, thus ensuring a more economical and ecological flying operation.

In addition, the object of the present invention is to increase the accuracy of the sensors, disturbed by the rotor downwash, when measuring the vertical speeds relative to the surrounding air.

The first object is solved in accordance with the invention by the method of the type mentioned in the introduction having the following steps:

establishing flight control signals for flight control with regard to the vertical movement axis of the helicopter and detecting resultant movements in the vertical movement axis of the helicopter, and detecting early the vortex ring state of the helicopter in accordance with a correlation between the flight control signals and the vertical movements in the vertical movement axis.

In principle, the helicopter responds immediately to control inputs made by the pilot for example, that is to say the flight control signals used for flight control with regard to the vertical movement axis of the helicopter result linearly in a corresponding movement of the vertical movement axis. In this case, the difference that the behavior of the helicopter is ultimately influenced by the control signals occurring at the rotor is key. By way of example, if the pilot makes an upward control input, the control signals are sent to the rotor and cause an increase of the angle of incidence of the rotor blades. The helicopter then also responds accordingly with a vertical upward movement.

It has now been recognized that this otherwise linear signal response pattern changes shortly before entry into the vortex ring state. Corresponding control inputs are not converted immediately into corresponding upwardly directed vertical movements, but are weakened or completely non-linear. The present invention therefore proposes that the flight control signals used for flight control of the helicopter with regard to the vertical movement axis are established continuously and the vertical movements of the helicopter resultant from these flight control signals are likewise accordingly detected continuously, wherein the vortex ring state is then detected early on the basis of a correlation between these two pieces of information. This is because it is then possible to determine on the basis of this correlation whether the helicopter is moving in the vicinity of the vortex ring state, since its flight control signals result in a modified response behavior of the helicopter.

The flight control signals resulting from the control inputs made by the pilot are advantageously established during this process.

In order to ensure that corresponding flight control signals and the resultant movements in the vertical movement axis are also present continuously for early detection of the vortex ring state, it is particularly advantageous if additional control signals are generated and impressed upon the flight control signals. In this case it is conceivable for the additional, automatically generated control signals to be impressed even if the flight control signals would cause no changes to the flight condition, and therefore the helicopter merely carries out a movement in the vertical movement axis due to the generated additional control signals. These generated additional control signals may be harmonic, low-frequency control signals in particular.

It is particularly advantageous if the vortex ring state is detected early in accordante with a non-linear correlation between flight control signals and the vertical movement of the vertical movement axis. In this case it has been recognized that the correlation between flight control signal flight control signals and the resultant vertical movements do not correlate linearly, particularly when the flight condition of the helicopter approaches the vortex ring state. This can be established for example on the basis of a function profile, wherein it is to be noted that the flatter the gradient of the curve, the closer is the helicopter to the vortex ring state.

The acceleration or speed in the movement axis is advantageously established to detect the movement in the vertical movement axis of the helicopter. The vertical acceleration can be established in this case by means of simple acceleration sensors. The speed can be detected in this case with the aid of GPS systems for example.

In addition it has been recognized that low-frequency flight control inputs in particular are suitable for establishing the proximity to the vortex ring state on the basis of the correlation with the vertical movements. The flight control signals can be established easily in this instance by frequency analysis thereof, for example by means of Fourier transformation.

The second object is achieved by the method of the type mentioned in the introduction for determining the speed of a helicopter in the vertical movement axis relative to the air surrounding the helicopter and having the following steps:

establishing flight control signals for flight control with regard to the vertical movement axis of the helicopter and detecting resultant movements in the vertical movement axis of the helicopter, and determining the speed in accordance with a correlation between the flight control signals and the vertical movements in the vertical movement axis.

In this case, the method for determining the speed relative to the air surrounding the helicopter is based on the same concept of the correlation between flight control signals and vertical movements of the vertical movement axis. The descent speed can be estimated on the basis of this correlation between the behavior of the helicopter in the vertical movement axis and the respective flight control signals, and the corresponding signals of the sensors arranged on the helicopter can thus be corrected easily. To this end, the flight control signals for flight control with regard to the vertical movement axis of the helicopter are established continuously. For example, this process of establishment can be carried out by tapping the flight control signals by means of a bus system within the helicopter. In addition to these flight control signals, the resultant movement in the vertical movement axis of the helicopter is continuously detected so as to relate the flight control signals to the respective vertical movements.

In this case, the vertical movements may be the vertical accelerations that can be established with the aid of suitable acceleration sensors, as known sufficiently from the prior art. The vertical movement may also be the speed however, which can be determined absolutely relative to the surface of the sea, for example with the aid of a GPS device.

The flight control signals are advantageously established in accordance with control inputs made by the pilot. So as to evaluate corresponding flight control signals at any moment however, it is particularly advantageous if additional control signals are generated with regard to the vertical movement axis and are then impressed upon the flight control signals. This results in principle in a corresponding behavior in the vertical movement axis, which can then be detected. These additional control signals, which are harmonically impressed in particular, may be low frequency and generally have no large amplitude deflections, since the helicopter would otherwise move very drastically in the vertical.

BRIEF DESCRIPTION OF THE DRAWINGS

The invention will be explained in greater detail by way of example on the basis of the accompanying drawings, in which.

DETAILED DESCRIPTION

FIG. 1 shows the schematic illustration of the vortex ring state 3 in the case of a helicopter 1. The helicopter 1 has a rotor 2, which turns at a corresponding revolutionary speed. Due to the slow to almost no forward flight and a correspondingly high descent rate, the helicopter 1 comes into its own downwash field, and therefore the downwardly pressed air 3a cannot be transported away quickly enough. After a certain time, this results in the effect that the rotor 2 again sucks in above its rotor the air 3a pressed away downwardly (illustrated by the arrow 3b), such that the air 3a pressed away downwardly is sucked in again. A vortex ring 3 around the rotor blade tips is thus produced and the flight condition of said rotor blade tips is then referred to as a vortex ring state.

The problem in this case is that the lift decreases rapidly due to the suction of the inherent downwash field 3a and the helicopter thus falls downward in the first instance. Several hundreds of meters can generally be lost during this process before the helicopter 1 can be brought back into a normal flight condition.

Figure 2:
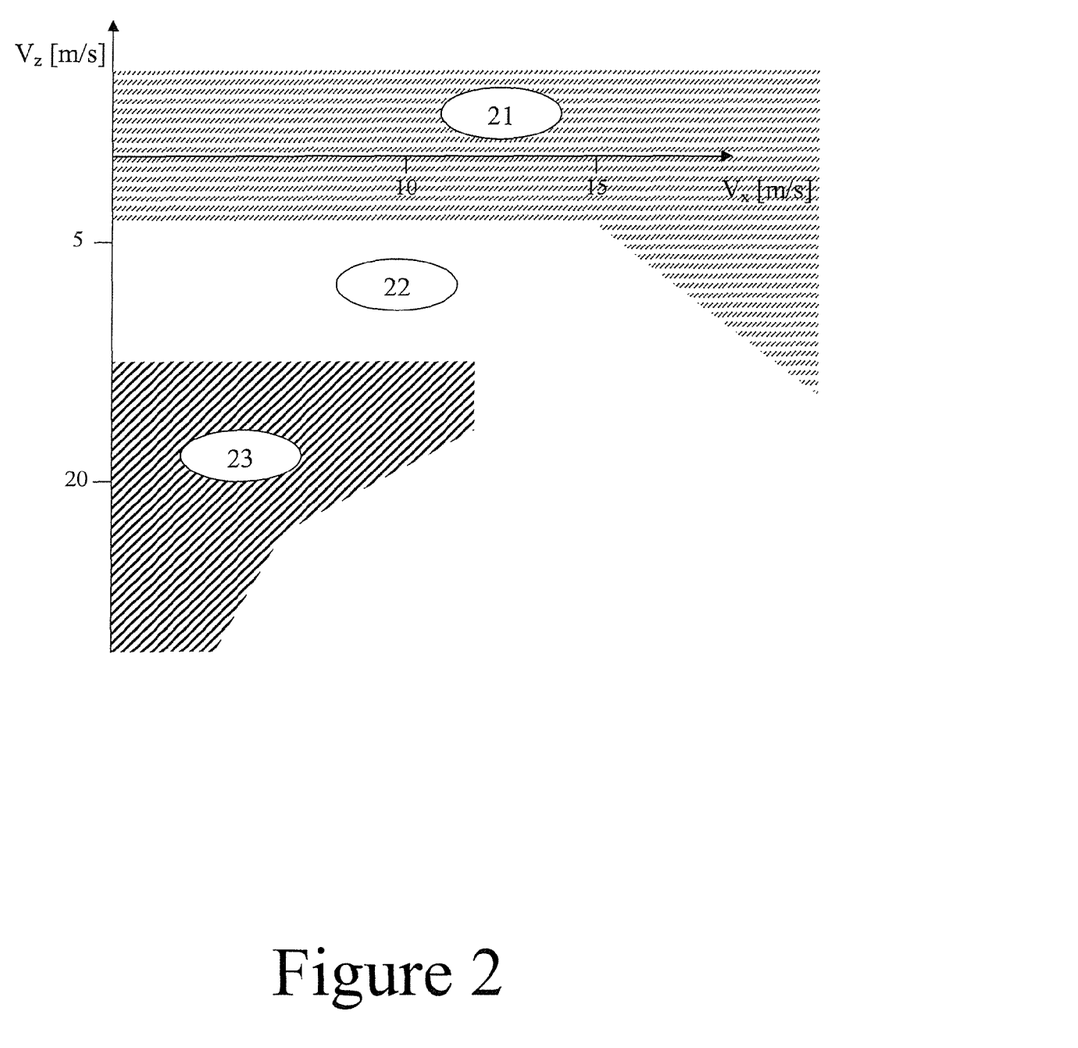
FIG. 2—illustrates the dependence of descent speed and forward speed.

FIG. 2 shows the relationship between descent speed and forward speed. In this case, the forward flight speed is plotted along the x-axis ($V_x$ in m/s), wherein the descent speed ($V_z$ in m/s) is illustrated along the y-axis. The helicopter is in a normal operating region in the upper region 21. Here, there is at no point the risk of the helicopter entering the vortex ring state.

The ordered safety reserve is located in the intermediate region 22. This region is to be avoided by the pilot and is used so that the helicopter does not enter the vortex ring state when flying at the edge of the normal operating region 21. If, however, the helicopter finds itself in the flight region 23, it is thus in the vortex ring state. This region is characterized by a very low forward flight speed (<10 m/s) and a very high descent speed (>5 m/s). In this region 23, which is to be considered highly critical, the helicopter then finds itself in the vortex ring state as shown in FIG. 1.

Figure 3:
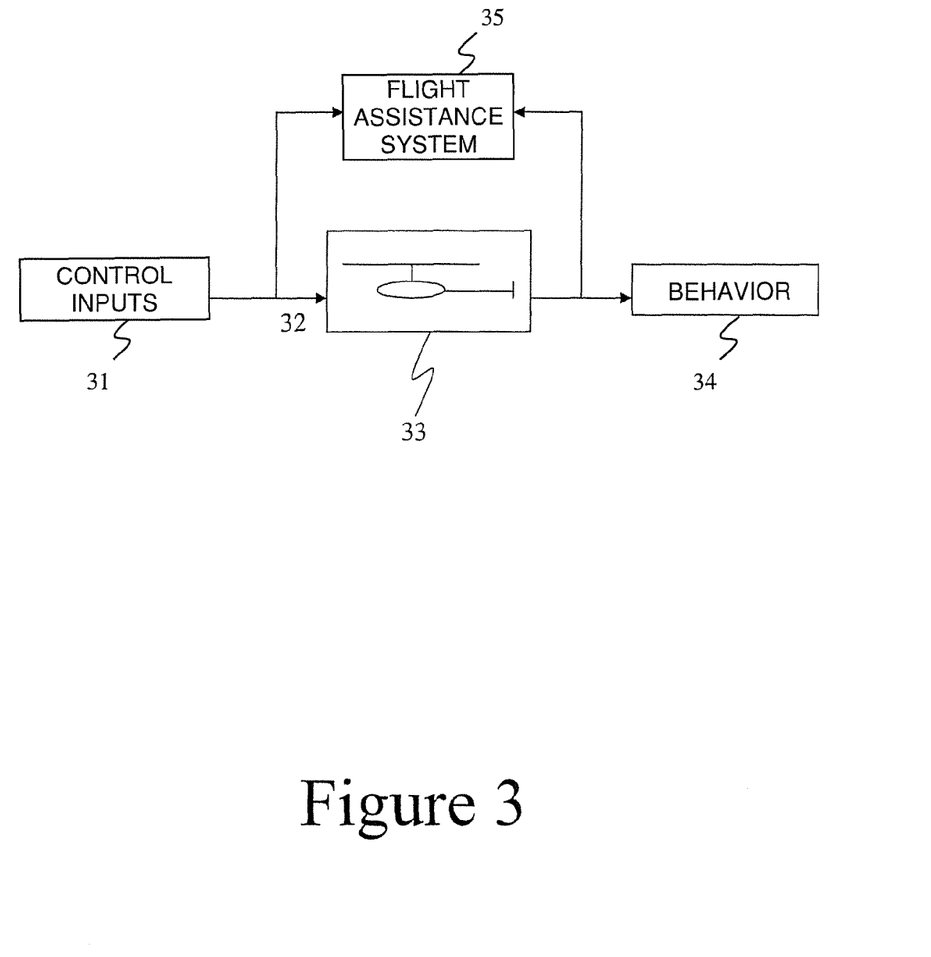
FIG. 3—shows a schematic illustration of the control reaction chain.

FIG. 3 shows a schematic view of the control reaction chain, as is used for the correlation of the present invention. The control inputs 31 are located on the left-hand side and are used as flight control signals 32 for flight control of the helicopter 33. These flight control signals 32 can be control inputs 31 that have been initiated by a pilot. So as to also obtain low-frequency control inputs 31 in any situation however, the present invention proposes generating a harmonic control signal in addition to the control inputs 31 made by the pilot, said harmonic control signal then being impressed upon the control inputs 31 so that a flight control signal 32 is given, which consists of the control inputs 31 made by the pilot and the additional harmonic control signals generated automatically. These flight control signals 32 are then used for flight control of the helicopter 33.

Due to these flight control signals 32, a corresponding behavior 34, in particular with regard to the vertical movement axis, can then be seen at the helicopter 33. Such behavior may in this case be the position, the rate of rotation, the acceleration or the speed for example, which can be detected by means of corresponding sensors.

Both the input (flight control signals 32) and the output (behavior 34) are conveyed in a corresponding flight assistance system 35, such that a corresponding movement of the helicopter in the vertical movement axis is also provided for each flight control signal. In this case it should be noted that this behavior may occur in a slightly delayed manner depending on the helicopter model, and therefore a gap in time may sometimes be present here between the flight control signals 32 and the resultant behavior 34 and has to be taken into consideration. The flight assistance system 35 can then detect early the vortex ring state and also determine the relative speed in relation to the surrounding air on the basis of the correlation between the flight control signals 32 and the behavior 34 in the vertical movement axis of the helicopter 33.

Figure 4:
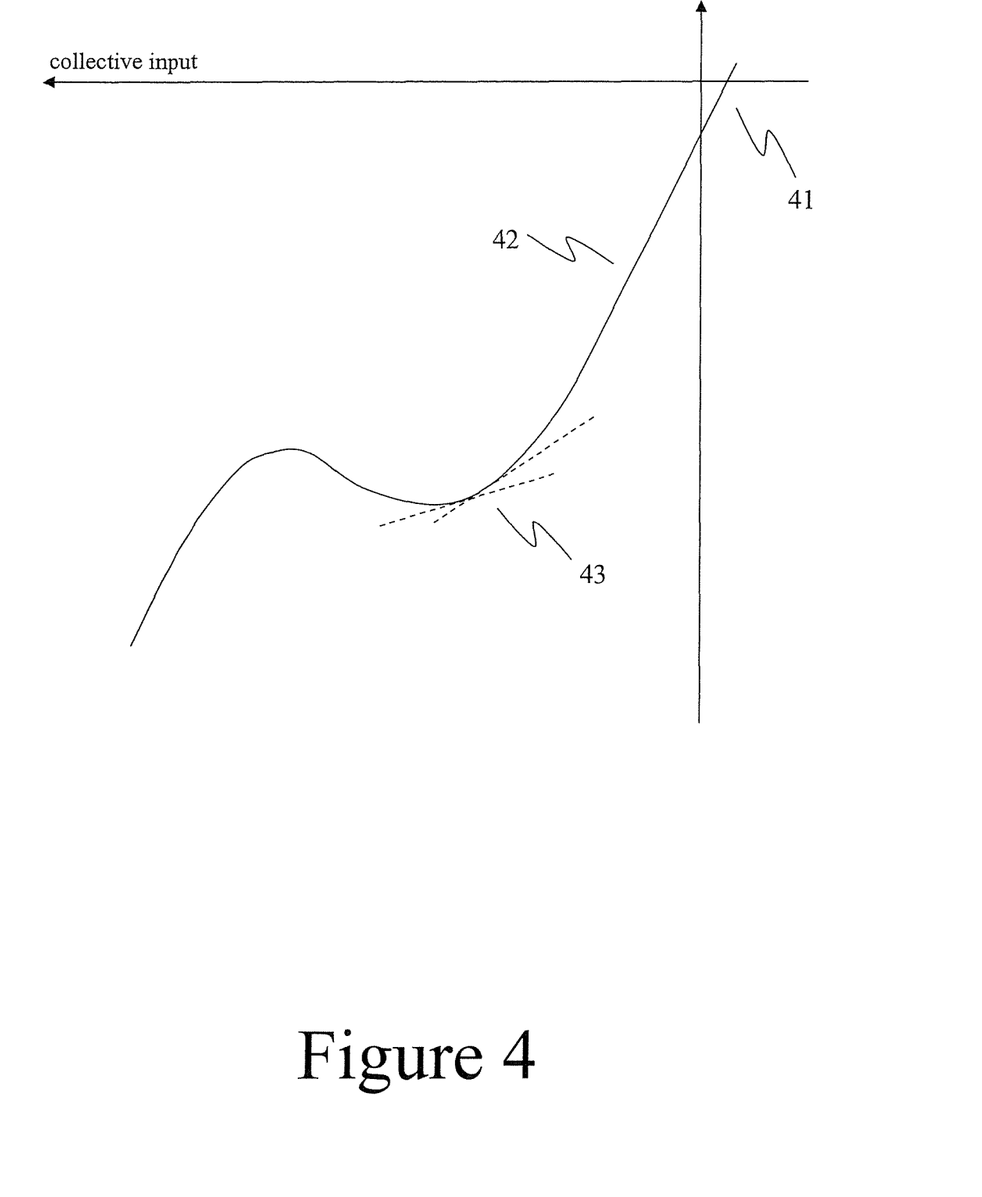
FIG. 4—shows a schematic illustration of the correlation.

This correlation is illustrated schematically in FIG. 4. Here, a curve 41 is shown, which shows the relationship between flight control signals and descent speed. In this case "collective input" is plotted along the x-axis as a flight control signal and relates to flight control with regard to the vertical movement axis. The descent speed is plotted over the y-axis as movement in the vertical movement axis.

As can be seen, the curve 41 is strictly linear in the upper region 42, which means that the flight control signals result in an immediate and linear movement. In other words, the behavior of the helicopter with regard to its vertical movement axis is completely linearly dependent on the input.

If the descent speed is increased by corresponding control signals, the risk of a vortex ring state is thus also greater. This can be seen in the curve 41 from a certain moment, more specifically in the region 43. From this region, the relationship between descent speed and control input changes, that is to say input flight control signals have an effect on the behavior of the helicopter that deviates from the normal situation. This changed region 43 can be established for example on the basis of the gradient of the curve in these regions, more specifically in such a way that the gradient decreases at this point. In this case it was found that the more the gradient decreases, the closer the flight condition of the helicopter moves into the vicinity of the vortex ring state.

This correlation illustrated in FIG. 4 has the key advantage in this instance that it is now possible, on the basis of the data present in the helicopter, to reliably determine how close the helicopter is being operated to the critical flight region of the vortex ring state.

With knowledge of this correlation, as illustrated in FIG. 4, it is also possible to approximately estimate the relative speed in relation to the ambient air of the helicopter, since it is possible to establish the region in which the helicopter is moving on the basis of the behavior thereof. With knowledge of the relative speed, as supplied (usually inaccurately) by the sensors, this signal can then be corrected with the aid of this present correlation. This is because the closer to the critical region of the vortex ring state the helicopter is operated, the more inaccurate the information supplied by the sensors concerning the relative speed of the surrounding air.

Figure 5:
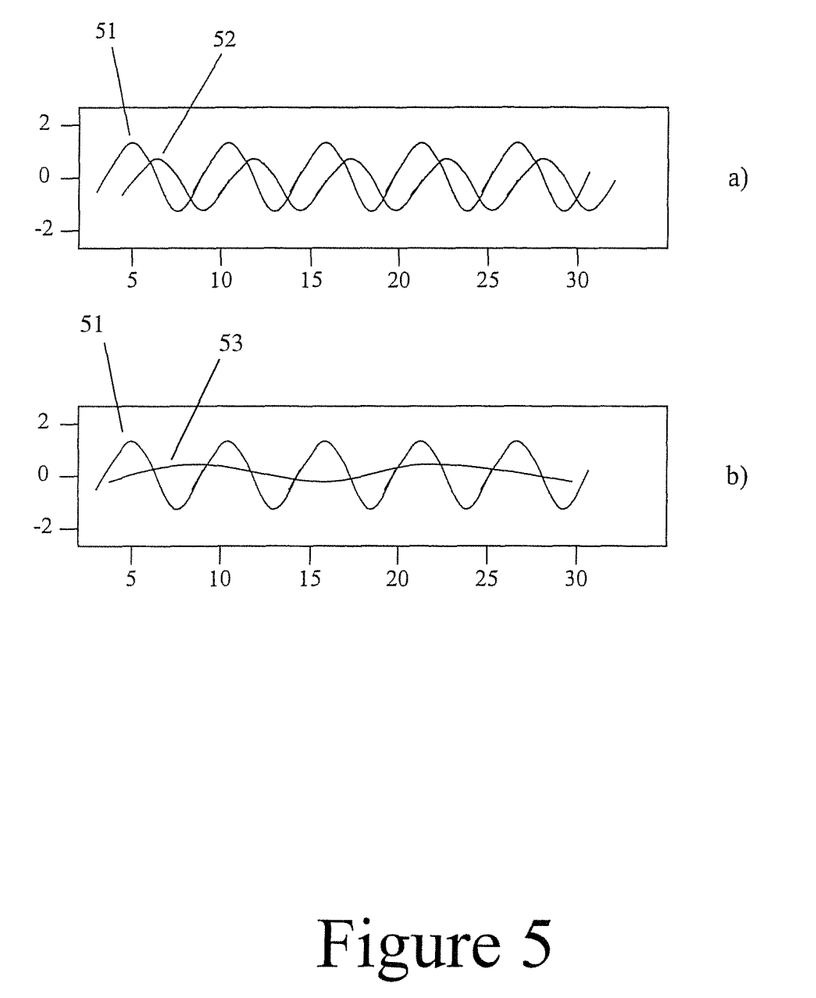
FIG. 5—shows an illustration of a different input/output behavior.

FIG. 5 shows a different input/output behavior. In this case a harmonic control signal 51 is generated, which is impressed upon the flight control signals and is thus included in the flight control. As illustrated in the top graph a), a corresponding behavior occurs in the vertical movement axis 52, which is completely linearly dependent on the control signal 51, due to the harmonic excitation by the generated additional control signal 51. In other words, the helicopter is located in the flight region shown in FIG. 4 in the linear region 42.

If the helicopter then comes into the critical region of the vortex ring state, this behavior in the vertical movement axis thus changes, as illustrated in graph b). In spite of the harmonic excitation by the harmonic control signal 51, a non-linear response or behavior 53 can be established, which has been transformed into time in this instance in graph B by means of Fourier transformation. In this case it can be determined that the movement in the vertical movement axis of the helicopter, as illustrated by the profile 53 in graph B, is very weak in spite of the high-amplitude harmonic control signal 51, which indicates that the helicopter is only moving slightly in the lift axis in spite of the control. Early detection of the vortex ring state can then be derived from this, or the proximity to the vortex ring state can be determined on the basis of the correlation between control and movement.

The invention claimed is:

1. A method for detection of an impending vortex ring state of a helicopter, having the following steps:
   establishing flight control signals for flight control with regard to a vertical movement axis of the helicopter in accordance with inputs initiated by a pilot;
   generating automatically, by a processor, additional control signals with regard to the vertical movement axis of the helicopter and impressing the additional control signals upon the flight control signals, wherein the additional control signals include harmonic control signals;
   detecting movements of the helicopter in the vertical movement axis of the helicopter with one or more flight behavior sensors;
   detecting, by the processor, a correlation between the flight control signals and the movements of the helicopter in the vertical movement axis; and identifying, by the processor, the impending vortex ring state of the helicopter when the correlation between the flight control signals and the movements of the helicopter in the vertical movement axis changes.

2. The method as claimed in claim 1, wherein said identifying step identifies the impending vortex ring state of the helicopter when the correlation between the flight control signals and the movements of the helicopter in the vertical movement axis changes from linear to non-linear.

3. The method as claimed in claim 1, wherein said step of detecting movements includes detecting one or more of accelerations, position, rates of rotation, and speeds of the helicopter as movements in the vertical movement axis of the helicopter.

4. A flight assistance system for detection of an impending vortex ring state of a helicopter, wherein the flight assistance system is adapted to:
- establish flight control signals for flight control with regard to a vertical movement axis of the helicopter in accordance with inputs initiated by a pilot;
- generate automatically additional control signals with regard to the vertical movement axis of the helicopter and impress the additional control signals upon the flight control signals, wherein the additional control signals include harmonic control signals;
- detect movements of the helicopter in the vertical movement axis of the helicopter with one or more flight behavior sensors;
- detect a correlation between the flight control signals and the movements of the helicopter in the vertical movement axis; and
- identify the impending vortex ring state of the helicopter when the correlation between the flight control signals and the movements of the helicopter in the vertical movement axis changes.

5. The flight assistance system as claimed in claim 4, wherein said flight assistance system identifies the impending vortex ring state of the helicopter when the correlation between the flight control signals and the movements of the helicopter in the vertical movement axis changes from linear to non-linear.

* * * * *